US010390134B2

(12) United States Patent
Pan

(10) Patent No.: US 10,390,134 B2
(45) Date of Patent: Aug. 20, 2019

(54) ON-BOARD DEVICE POSITIONING APPARATUS, METHOD AND ON-BOARD EQUIPMENT CONTROL SYSTEM BASED ON MIXED AUDIO

(71) Applicant: NIO CO., LTD., Shanghai (CN)

(72) Inventor: Rongkai Pan, Shanghai (CN)

(73) Assignee: NIO CO., LTD, Shanghai (CN)

( * ) Notice: Subject to any disclaimer, the term of this patent is extended or adjusted under 35 U.S.C. 154(b) by 0 days.

(21) Appl. No.: 15/866,707

(22) Filed: Jan. 10, 2018

(65) Prior Publication Data

US 2018/0199135 A1 Jul. 12, 2018

(30) Foreign Application Priority Data

Jan. 11, 2017 (CN) .......................... 2017 1 0019076

(51) Int. Cl.
*H04R 3/00* (2006.01)
*H04R 1/40* (2006.01)
*H04B 1/00* (2006.01)

(52) U.S. Cl.
CPC ............. *H04R 3/005* (2013.01); *H04R 1/406* (2013.01); *H04R 2499/13* (2013.01)

(58) Field of Classification Search
CPC ..... H04R 3/005; H04R 1/406; H04R 2499/13
USPC ...................................................... 381/86, 92
See application file for complete search history.

(56) References Cited

U.S. PATENT DOCUMENTS

| | | | | |
|---|---|---|---|---|
| 2012/0197637 | A1* | 8/2012 | Gratke | G10L 21/02 704/226 |
| 2014/0006026 | A1* | 1/2014 | Lamb | G10L 17/00 704/246 |
| 2014/0335902 | A1* | 11/2014 | Guba | H04W 4/027 455/456.4 |
| 2016/0266235 | A1* | 9/2016 | Hannon | G01S 5/30 |
| 2017/0134853 | A1* | 5/2017 | Beaty | H04R 3/005 |

FOREIGN PATENT DOCUMENTS

| | | |
|---|---|---|
| CN | 102629930 | 8/2012 |

* cited by examiner

*Primary Examiner* — Xu Mei
*Assistant Examiner* — Ammar T Hamid
(74) *Attorney, Agent, or Firm* — Sheridan Ross P.C.

(57) ABSTRACT

A positioning apparatus for locating devices within a vehicle is provided. The positioning apparatus comprises: at least two sets of MICs, including at least one set of MICs provided at a first position and at least another set of MICs provided at a second position which is different from the first position, the at least two sets of MICs are used for gathering mixed audio corresponding to an object to be positioned, and wherein the mixed audio contains at least a first audio and a second audio; and a control unit which is capable of determining position of the object within the vehicle in accordance with the first audio and identifying the object in accordance with the second audio.

10 Claims, 2 Drawing Sheets

ON-BOARD DEVICE POSITIONING APPARATUS, METHOD AND ON-BOARD EQUIPMENT CONTROL SYSTEM BASED ON MIXED AUDIO

CROSS-REFERENCE TO RELATED APPLICATIONS

This application claims the benefit of China Patent Application No. 201710019076.2 filed Jan. 11, 2017, the entire contents of which are incorporated herein by reference.

TECHNICAL FIELD

The present application relates to the technical field of positioning, particularly to an on-board device positioning apparatus, method and on-board equipment control system based on mixed audio.

BACKGROUND

As an increasing number of vehicles enter into ordinary families, there are more and more vehicles driving on roads. Accordingly, installed with more on-board equipment such as on-board air conditioner, on-board stereo and vehicle window systems, etc., the vehicles become increasingly intelligent and user-friendly. However, the control panel of on-board equipment is usually disposed in the front of the vehicle and therefore accessible only by occupants seated at front row seats. Accordingly, occupants seated on back row seats have to rely on front row occupants to operate the equipment, greatly degrading their riding experience. On the other hand, requirements for controlling these equipment vary from occupant to occupant according to their specific on-board positions, so the first thing to do is to determine each occupant's specific position so as to meet their operating requirement. This problem is what the application aims to solve.

SUMMARY

To solve the above described problems in the prior art, that is, to determine the specific positions of the occupants when they try to control on-board equipment, the present application provides a positioning apparatus for locating devices within a vehicle based on mixed audio, which comprises: at least two sets of MICs, including at least one set of MICs provided at a first position and at least another set of MICs provided at a second position which is different from the first position, wherein the at least two sets of MICs are used for gathering mixed audio corresponding to an object to be positioned, and wherein the mixed audio contains at least a first audio and a second audio; and a control unit which is capable of determining on-board position of the object to be positioned in accordance with the first audio based on the at least one set of MICs at the first position and the at least another set of MICs at the second position; and the control unit is also capable of identifying the object to be positioned in accordance with the second audio.

In a preferable embodiment of the above positioning apparatus, a set of MICs is provided at each of the first and second positions, with each set of MICs including two MICs, and the first position is at a B column of either side of the vehicle while the second position is at inner ceiling of the vehicle.

In a preferable embodiment of the above positioning apparatus, the control unit calculates the position of the object to be positioned within the vehicle in accordance with angles of the first audio reaching each set of MICs.

In a preferable embodiment of the above positioning apparatus, the second audio contains ID of the object to be positioned, the control unit is capable of obtaining the ID of the object to be positioned, and the control unit sends the position of the object to be positioned within the vehicle to the object in accordance with its ID.

In a preferable embodiment of the above positioning apparatus, the object to be positioned is a terminal device which is capable of sending out mixed audio.

In a preferable embodiment of the above positioning apparatus, the terminal device is a cell phone or a pad; and/or the terminal device is installed with an APP for operating equipment within the vehicle, the terminal device is capable of sending out mixed audio during or after opening of the APP.

In a preferable embodiment of the above positioning apparatus, in case of the position of the terminal device being determined, the terminal device is capable of obtaining right to operate equipment within the vehicle.

In another aspect, the present application provides a positioning method for locating devices within a vehicle based on mixed audio, which comprises the following steps:

providing at least two sets of MICs, including at least one set of MICs provided at a first position and at least another set of MICs provided at a second position which is different from the first position;

gathering mixed audio corresponding to an object to be positioned by means of the at least two sets of MICs, wherein the mixed audio contains at least a first audio and a second audio;

determining position of the object to be positioned within the vehicle in accordance with the first audio based on the at least one set of MICs at the first position and the at least another set of MICs at the second position; and identifying the object to be positioned in accordance with the second audio.

In a preferable embodiment of the above positioning method, a set of MICs is provided at each of the first and second positions, with each set of MICs including two MICs, and the first position is at a B column of either side of the vehicle while the second position is at inner ceiling of the vehicle.

In a preferable embodiment of the above positioning method, in the step of determining position of the object to be positioned within the vehicle in accordance with the first audio received, the position of the object to be positioned within the vehicle is calculated in accordance with angles of the first audio reaching each set of MICs; and the second audio contains ID of the object to be positioned, in the step of identifying the object to be positioned in accordance with the second audio, the ID of the object to be positioned is obtained and the position of the object to be positioned within the vehicle is sent to the object in accordance with its ID.

In a preferable embodiment of the above positioning method, the object to be positioned is a cell phone or a pad; and/or the cell phone or pad is installed with an APP for operating equipment within the vehicle, the cell phone or pad is capable of sending out mixed audio during or after opening of the APP.

In a preferable embodiment of the above positioning method, in case of the position of the object being determined, it is capable of obtaining right to operate equipment within the vehicle.

In yet another aspect, the present application provides a control system for controlling devices within a vehicle based on mixed audio, wherein the system includes: one of the above positioning apparatus for locating devices within a vehicle; an object to be positioned for operating equipment within the vehicle; authorizing module for entitling the object to be positioned with right to control equipment within the vehicle in accordance with its position within the vehicle.

In a preferable embodiment of the above control system, the authorizing module entitles the object to be positioned only with right to control those equipment near itself.

In a preferable embodiment of the above control system, the object to be positioned is a cell phone or a pad; and the cell phone or pad is installed with an APP for operating equipment within the vehicle, the cell phone or pad is capable of sending out mixed audio during or after opening of the APP.

In the preferred embodiments of the application, the control unit calculates the position of the object to be positioned within the vehicle in accordance with angles of the first audio reaching each set of MICs, and identifies the object to be positioned in accordance with the second audio, thereby realizing automatic positioning of the object within the vehicle. In case of the position of the object being determined, it is capable of obtaining right to operate equipment within the vehicle. Accordingly, when occupants use the object to operate equipment within the vehicle, they can only operate those equipment corresponding to their positions and cannot operate equipment near others, thereby avoiding cross interference among different persons when they operate equipment within the vehicle.

DETAILED DESCRIPTION

The preferred embodiments of the application are described below with reference to the accompanying figures. As will be understood by those skilled in the art, these embodiments are merely used for interpreting the technical principle of the application and are not intended to limit its protection scope in any way.

Audio positioning is a technology in which a model is established for a sound field containing one or more simulated sound sources to achieve the purpose of positioning each simulated sound source. Sound source positioning technology is one of the advanced technologies of audio signal processing. Many researches have been made on algorithms of sound source positioning and there have been developed applications at present. For example, sound source positioning technology is used for controlling cameras to direct it toward speakers during video conference. As another example, in those vehicles running at high speed, sound source positioning technology could be used in on-board hand-free telephone, which can ascertain actual source of an order and make response to the same, etc. Since sound source positioning technology is already know in the art, detailed description regarding the same will be omitted herein. The present application employs the technology to realize positioning of an object within vehicle.

The positioning apparatus for locating devices within a vehicle based on mixed audio according to the present application comprises at least two sets of MICs, which include at least one set of MICs provided at a first position and at least another set of MICs provided at a second position which is different from the first position, the at least two sets of MICs are used for gathering mixed audio corresponding to an object to be positioned, and the mixed audio contains at least a first audio and a second audio. In the present embodiment, the object to be positioned is a terminal device which is capable of sending out mixed audio which includes the first audio and the second audio. Preferably, the terminal device may be a cell phone or a pad or operating terminals of any other forms. In the following, cell phone will be taken as an example of the object to be positioned to illustrate the positioning apparatus for locating devices within a vehicle based on mixed audio of the present application.

Figure 1:
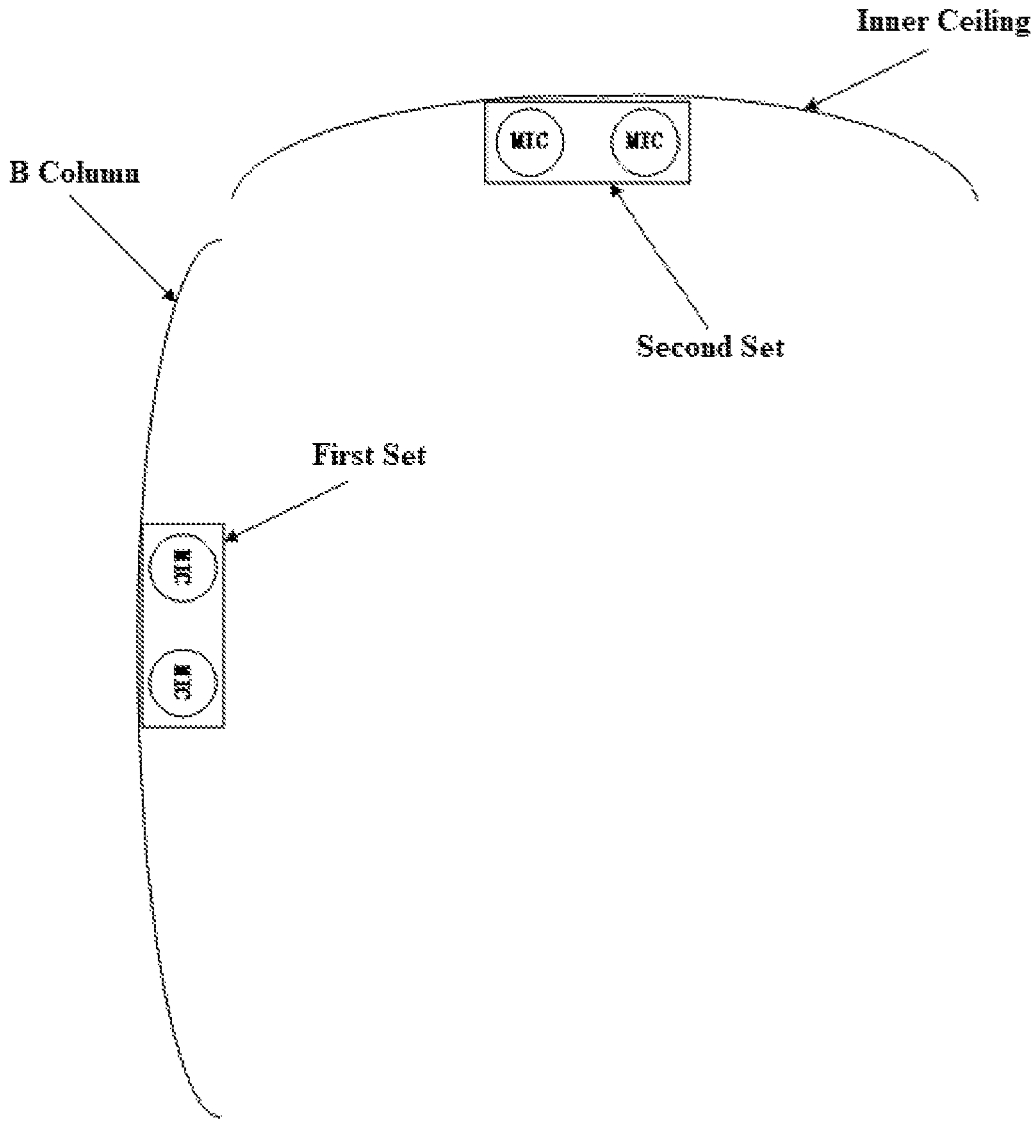
FIG. 1 is a top structural schematic view of a positioning apparatus for locating devices within a vehicle based on mixed audio according to the present application.

In the present embodiment, a set of MICs is provided at each of the first and second positions, the first position is at a B column of either side of the vehicle and the second position is at inner ceiling of the vehicle. Referring to FIG. 1 which is a top structural schematic view of a positioning apparatus for locating devices within a vehicle based on mixed audio according to the present application, the first set of MICs is provided at the first position (a B column of either side of the vehicle), and the second set of MICs is provided at the second position (inner ceiling of the vehicle), as shown in FIG. 1. Preferably, the first set of MICs is provided at a position above the B column of either side of the vehicle, and the second set of MICs is provided at the position of the sunroof control panel, facing downward. As such, the first set of MICs and the second set of MICs are arranged perpendicular to each other, that is, the vertical plane in which the first set of MICs is located perpendicularly crosses with the vertical plane in which the second set of MICs is located. As can be understood by those skilled in the art that the first set of MICs is provided at the B column of either side of the vehicle to divide the vehicle cabin space into two areas, i.e., front row and back row, the second set of MICs is provided at the sunroof control panel to divide the vehicle cabin space into two areas, i.e., left and right areas. In other words, the first set of MICs and the second set of MICs are perpendicularly crossed to divide the vehicle cabin space into four portions, i.e., driver seat portion, copilot seat portion, back row left portion and back row right portion. Although the first set of MICs is shown at the left B column of the vehicle, it is apparent that the first set of MICs can be provided at the right B column of the vehicle.

The positioning apparatus of the present application further comprises a control unit which can take the form of ECU of the vehicle or a separate on-board processor etc., or any other suitable forms, such as a remote server. During the process of positioning a cell phone within the vehicle, the MICs convert the received audio into audio signals and send them to the control unit which determines the position (driver seat portion, copilot seat portion, back row left portion and back row right portion) of the cell phone within the vehicle in accordance with the angles of the first audio signal reaching each set of MICs after receiving it from the first set of MICs and the second set of MICs. Specifically, the control unit determines whether the cell phone is at the front row or the back row in accordance with the angle of the first audio reaching the first set of MICs at a B column of either side of the vehicle (taking the left B column as an example) after receiving the first audio from the first set of MICs, and then the control unit determines whether the cell phone is at the left portion or the right portion within the vehicle in accordance with the angle of the first audio reaching the second set of MICs at sunroof control panel of the vehicle after receiving the first audio from the second set of MICs. Next, the control unit finally determines the position of the cell phone within the vehicle (driver seat portion, copilot seat portion, back row left portion or back row right portion) in accordance with the angles of the first audio reaching each set of MICs. In the present embodiment, the first audio may be a low frequency audio, such as a fraction of music or a section of sound with company symbol.

As mentioned above, the MICs convert the mixed audio into audio signals and send them to the control unit. After receiving the audio signals, the control unit separates the second audio from the mixed audio signals and identifies the cell phone. Specifically, the second audio may be a high frequency audio containing ID of the cell phone. In the present application, ID refers to identity information of the cell phone, which can be any form of information uniquely indicating identity of the cell phone. The control unit identifies the cell phone by obtaining its ID. For example, the high frequency audio can be encoded with the ID of the cell phone by means of a certain algorithm, the control units separates the high frequency audio from the mixed audio signal after receiving it and decodes the audio with an algorithm corresponding to the encoding algorithm to obtain the ID of the cell phone and thus determine which cell phone the position calculated from the first audio belongs to. Further, the control unit sends the position of the cell phone within the vehicle to the cell phone in accordance with its ID. With the positioning apparatus of the present application, the position of the cell phone within the vehicle can be successfully determined.

It should be pointed out herein that when the control unit is a remote server, the positioning apparatus should also include other auxiliary function modules, such as a communication module capable of communicating with the remote server. The communication module facilitates transmission of the audio signals gathered by the MICs to the remote server which can further send the on-board position (position within the vehicle) of the cell phone to the cell phone to realize positioning of the cell phone within the vehicle.

In the present embodiment, users could use cell phones to control equipment within the vehicle, for example, using APP installed in the cell phones to control equipment within the vehicle. After on-board positions of the cell phones are determined, the cell phones could be assigned with their right to control equipment within the vehicle. For example, when the on-board positions of the cell phones are determined, the control unit is capable of assigning the cell phones with right to control equipment within the vehicle in accordance with their on-board positions, for instance, only allowing the occupants on corresponding seats to control the on-board equipment nearby with their cell phones by means of the cell phones. It should be noted that when the control unit sends the on-board position to the cell phone, it can send the control right together to the cell phone, or the cell phone APP could automatically assign its right to control equipment within the vehicle in accordance with the positional information received. It should also be noted that the expression "equipment nearby" mentioned in the present embodiment can be understood as those equipment spatially adjacent or functionally associated with the current position of the cell phone. For example, if the current position of the cell phone is the copilot seat, the operable on-board equipment may include door window of the copilot seat, outlet of air conditioner near the copilot seat, etc., and may exclude equipment near other positions, such as driver seat portion, back row left portion, back row right portion and so on.

In addition, when the cell phone is installed with an APP for operating equipment within the vehicle, the cell phone is capable of sending out mixed audio (including the first audio and the second audio) during or after opening of the APP. The control unit determines the on-board position of the cell phone in accordance with the mixed audio received and determines the identity of the cell phone, thereby determining the control right matching the position. At this time, if the cell phone APP is used to open the door window, it can only control opening or closing of the door window near its position, such as the copilot seat, and cannot operate the door windows near other seats.

Figure 2:
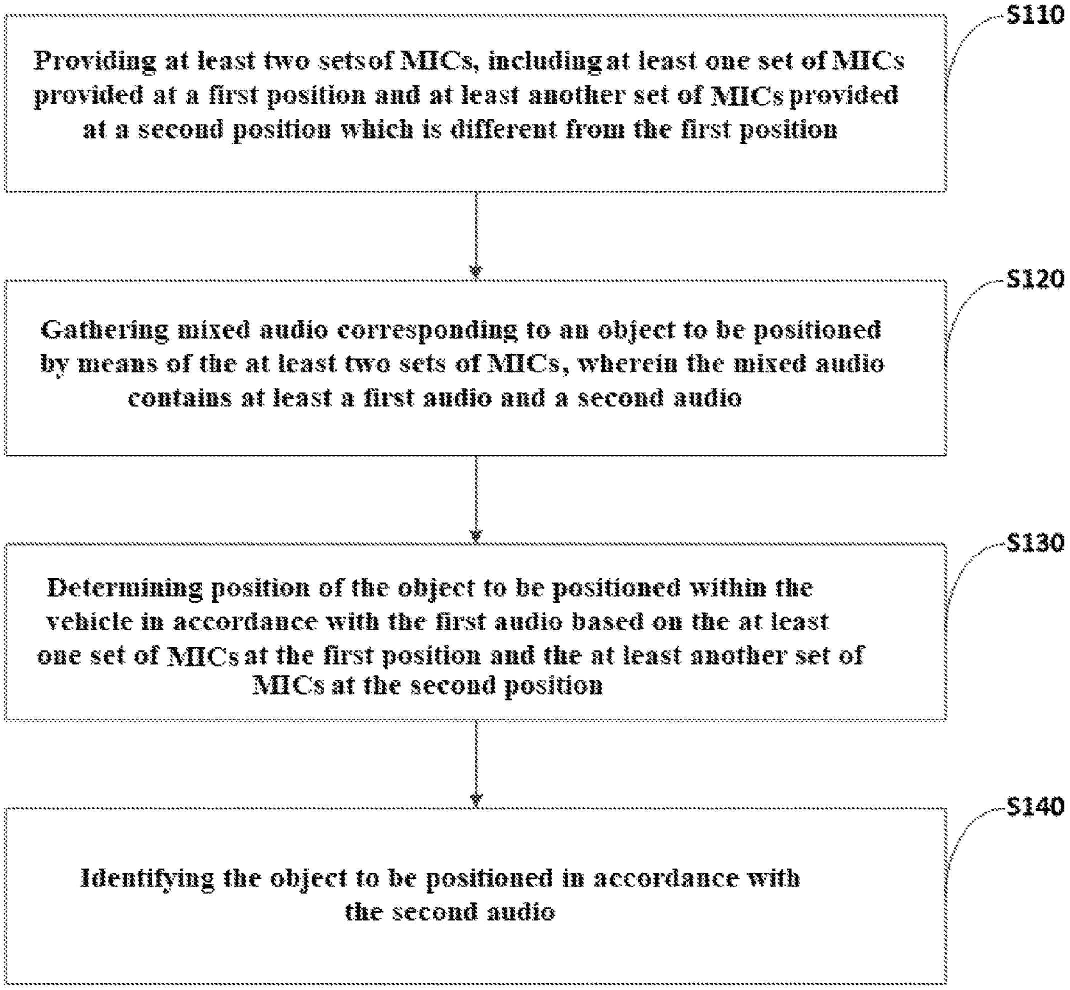
FIG. 2 is a flow chart of a positioning method for locating devices within a vehicle based on mixed audio according to the present application.

In another aspect, the present application provides a positioning method for locating devices within a vehicle based on mixed audio. As shown in FIG. 2, the method comprises the following steps:

S110, providing at least two sets of MICs, including at least one set of MICs provided at a first position and at least another set of MICs provided at a second position which is different from the first position;

S120, gathering mixed audio corresponding to an object to be positioned by means of the at least two sets of MICs, wherein the mixed audio contains at least a first audio and a second audio;

S130, determining on-board position of the object to be positioned in accordance with the first audio based on the at least one set of MICs at the first position and the at least another set of MICs at the second position;

S140, identifying the object to be positioned in accordance with the second audio.

Specifically, during the step S110, a set of MICs is provided at each of the first and second positions, the first position is at a B column of either side of the vehicle and the second position is at inner ceiling of the vehicle. Referring to FIG. 1, the first set of MICs is provided at the first position (a B column of either side of the vehicle), and the second set of MICs is provided at the second position (inner ceiling of the vehicle). Preferably, the first set of MICs is provided at a position above the B column of either side of the vehicle, and the second set of MICs is provided at the position of sunroof control panel, facing downward. As such, the first set of MICs and the second set of MICs are arranged perpendicular to each other, that is, the vertical plane in which the first set of MICs is located perpendicularly crosses with the vertical plane in which the second set of MICs is located. As can be understood by those skilled in the art that the first set of MICs is provided at the B column of either side of the vehicle to divide the vehicle cabin space into two areas, i.e., front row and back row, the second set of MICs is provided at the sunroof control panel to divide the vehicle cabin space into two areas, i.e., left and right areas. In other words, the first set of MICs and the second set of MICs are perpendicularly crossed to divide the vehicle cabin space into four portions, i.e., driver seat portion, copilot seat portion, back row left portion and back row right portion. Although the first set of MICs is shown at the left B column of the vehicle, it is apparent that the first set of MICs can be provided at the right B column of the vehicle.

During the step S120, the object to be positioned may be a cell phone or a pad, which is capable of sending out mixed audio (including a first audio and a second audio). In the present embodiment, cell phone is taken as an example of the object to be positioned to illustrate the positioning method based on mixed audio of the present application.

During the step S130, the MICs convert the gathered mixed audio into audio signals and send them to the control unit which determines the on-board position (driver seat portion, copilot seat portion, back row left portion and back row right portion) of the cell phone in accordance with the angle of the first audio reaching each set of MICs after receiving it from the first set of MICs and the second set of MICs. Specifically, the control unit determines whether the cell phone is at the front row or the back row in accordance with the angle of the first audio reaching the first set of MICs at a B column of either side of the vehicle (taking the left B column as an example) after receiving the first audio from the first set of MICs, and then the control unit determines whether the cell phone is at the left portion or the right portion within the vehicle in accordance with the angle of the first audio reaching the second set of MICs at sunroof control panel of the vehicle after receiving the first audio from the second set of MICs. Next, the control unit finally determines the position of the cell phone within the vehicle (driver seat portion, copilot seat portion, back row left portion and back row right portion) in accordance with the angles of the first audio reaching each set of MICs. In the present embodiment, the first audio may be a low frequency audio, such a fraction of music or a section of sound with company symbol.

During the step S140, the MICs convert the gathered mixed audio into audio signals and send them to the control unit. After receiving the audio signals, the control unit separates the second audio from the mixed audio signals and identifies the cell phone. Specifically, the second audio may be a high frequency audio containing ID of the cell phone. In the present application, ID refers to identity information of the cell phone, which can be any form of information uniquely indicating identity of the cell phone. The control unit identifies the cell phone by obtaining its ID. For example, the high frequency audio can be encoded with the ID of the cell phone by means of a certain algorithm, the control units separates the high frequency audio from the mixed audio signal after receiving it and decodes the audio with an algorithm corresponding to the encoding algorithm to obtain the ID of the cell phone and thus determine which cell phone the position calculated from the first audio belongs to. Further, the control unit sends the on-board position of the cell phone to the cell phone in accordance with its ID. With the positioning method of the present application, the position of the cell phone within the vehicle can be successfully determined.

In the present embodiment, users could use cell phones to control equipment within the vehicle, for example, using APP installed in the cell phones to control equipment within the vehicle. After on-board positions of the cell phones are determined, the cell phones could be assigned with their right to control equipment within the vehicle. For example, when the on-board positions of the cell phones are determined, the control unit is capable of assigning the cell phones with right to control equipment within the vehicle in accordance with the on-board positions of the cell phones, for instance, only allowing the cell phones to control the on-board equipment near themselves. It should be noted that when the control unit sends the on-board position to the cell phone, it can send the control right together to it, or the cell phone APP could automatically assign its right to control equipment within the vehicle in accordance with the positional information received. It should also be noted that the expression “equipment nearby” mentioned in the present embodiment can be understood as those equipment spatially adjacent or functionally associated with the current position of the cell phone. For example, if the current position of the cell phone is the copilot seat, the operable on-board equipment may include door window of the copilot seat, outlet of air conditioner near the copilot seat, etc., and may exclude equipment near other positions, such as driver seat portion, back row left portion, back row right portion and so on.

In addition, when the cell phone is installed with an APP for operating equipment within the vehicle, the cell phone is capable of sending out mixed audio (including the first audio and the second audio) during or after opening of the APP. The control unit determines the on-board position of the cell phone in accordance with the mixed audio received and determines the identity of the cell phone, thereby determining the control right matching the position. At this time, if the cell phone APP is used to open the door window, it can only control opening or closing of the door window near its position, such as the copilot seat, and cannot operate the door windows of other seats.

Figure 3:
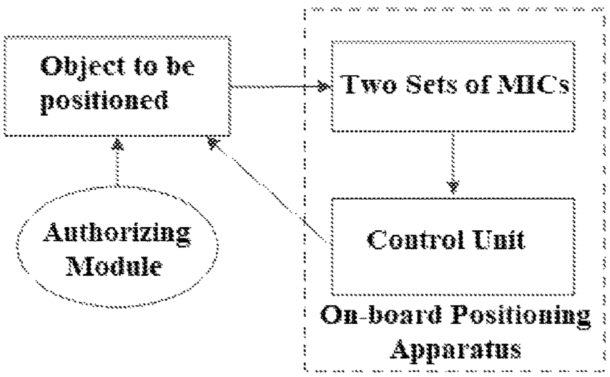
FIG. 3 is a structural schematic view of a control system for controlling devices within a vehicle based on mixed audio according to the present application.

Moreover, the technical solutions of the present application can also be implemented as a control system for controlling devices within a vehicle based on mixed audio. As shown in FIG. 3, the system includes: the above mentioned positioning apparatus, an object to be positioned and an authorizing module. Among others, the object to be positioned is used for operating equipment within the vehicle; the authorizing module is used for entitling the object to be positioned with right to control equipment within the vehicle in accordance with its position within the vehicle. The authorizing module only allows the object to be positioned to operate those on-board equipment near its position.

As a preferable embodiment, the object to be positioned is a cell phone or pad; and the cell phone or pad is installed with an APP for operating equipment within the vehicle, the cell phone or pad is capable of sending out mixed audio during or after opening of the APP.

In case of the position of the object being determined, such as at the driver seat portion, copilot seat portion, back left portion and back right portion, the control unit can identify the object, and the authorizing module can assign the object with corresponding right to control on-board equipment in accordance with its position. It should be noted that the control unit can be realized in combination with existing systems, such as a function module of the ECU of the vehicle or a dedicated module. For example, the authorizing module may be an APP installed in a cell phone or a pad, which entitles the APP itself with corresponding control right in accordance with the position of the cell phone or the pad. Alternatively, the control unit could assign corresponding control right to the cell phone or the pad through the authorizing module. Changes or adjustments in this regard do not depart from the principle of the present application and will fall within the protection scope of the present application.

In summary, with the technical solutions of the present application, on-board position of an object such as a cell phone or a pad or other similar terminal devices, can be automatically determined, and the right to control on-board equipment can be accordingly assigned in accordance with its position within the vehicle. This makes it possible that when occupants use the object to operate equipment within the vehicle, they can only operate those equipment corresponding to their positions and cannot operate equipment near others, thereby avoiding cross interference among different persons when they operate equipment within the vehicle.

So far the technical solutions of the application are described with reference to the preferred embodiments shown in the accompanying figures. As will be understood by those skilled in the art, however, these specific embodiments are not intended to limit protection scope of the application. Without departing from the principle of the application, various changes may be made and equivalents may be substituted for related technical features by those skilled in the art, the varied technical solutions will fall within the protection scope of the application.

What is claimed is:

1. A positioning apparatus within a vehicle based on mixed audio, comprising:

a plurality of first MICs arranged along a first direction and provided at a first position and a plurality of second MICs arranged along a second direction and provided at a second position which is different from the first position, and the first and second directions are perpendicular, wherein the pluralities of first and second MICs are used for gathering mixed audio corresponding to an object to be positioned, wherein the mixed audio contains at least a first audio at a first frequency and a second audio at a second frequency, and wherein the first plurality of MICs detects a first reception angle of the first audio, and the second plurality of MICs detects a second reception angle of the first audio; and a control unit which is capable of determining an on-board position of the object to be positioned in accordance with the first audio based on the first reception angle and the second reception angle of the first audio;

the control unit is also capable of identifying the object to be positioned in accordance with the second audio;

wherein the object to be positioned is a terminal device which is capable of sending the mixed audio;

wherein the terminal device is a cell phone or a pad, the terminal device is installed with an APP for operating equipment within the vehicle, and the terminal device is capable of sending the mixed audio during or after opening of the APP; and wherein in case of the position of the terminal device being determined, the terminal device is capable of obtaining a right to operate equipment within the vehicle.

2. The positioning apparatus within a vehicle based on mixed audio as set forth in claim 1, wherein and the first position is at a B column of either side of the vehicle while the second position is at an inner ceiling of the vehicle.

3. The positioning apparatus within a vehicle based on mixed audio as set forth in claim 2, wherein the control unit calculates a front position or back position of the object to be positioned within the vehicle based on the first reception angle of the first audio reaching the plurality of first MICs, and the control unit calculates a left position or right position of the object to be positioned within the vehicle based on the second reception angle of the first audio reaching the plurality of second MICs.

4. The positioning apparatus within a vehicle based on mixed audio as set forth in claim 3, wherein the second audio contains ID of the object to be positioned, the control unit is capable of obtaining the ID of the object to be positioned, and the control unit sends the position of the object to be positioned within the vehicle to the object in accordance with its ID.

5. A positioning method within a vehicle based on mixed audio, comprising the following steps:

providing a plurality of first MICs arranged along a first direction and provided at a first position and a plurality of second MICs arranged along a second direction and provided at a second position which is different from the first position, and the first and second directions are perpendicular;

gathering mixed audio corresponding to an object to be positioned by the pluralities of first and second MICs, wherein the mixed audio contains at least a first audio at a first frequency and a second audio at a second frequency, and wherein the first plurality of MICs detects a first reception angle of the first audio, and the second plurality of MICs detects a second reception angle of the first audio;

determining a position of the object to be positioned within the vehicle in accordance with the first audio based on the first reception angle and the second reception angle of the first audio;

identifying the object to be positioned in accordance with the second audio;

wherein the object to be positioned is a cell phone or a pad, the cell phone or pad is installed with an APP for operating equipment within the vehicle, and the cell phone or pad is capable of sending the mixed audio during or after opening of the APP;

wherein in case of the position of the object being determined, it is capable of obtaining a right to operate equipment within the vehicle.

6. The positioning method within a vehicle based on mixed audio as set forth in claim 5, wherein the first position is at a B column of either side of the vehicle while the second position is at an inner ceiling of the vehicle.

7. The positioning method within a vehicle based on mixed audio as set forth in claim 6, wherein in determining a position of the object to be positioned within the vehicle in accordance with the first audio received, a front position or back position of the object to be positioned within the vehicle is calculated based on the first reception angle of the first audio reaching the plurality of first MICs, and a left position or right position of the object to be positioned within the vehicle is calculated based on the second reception angle of the first audio reaching the plurality of second MICs; and the second audio contains ID of the object to be positioned, wherein in identifying the object to be positioned in accordance with the second audio, the ID of the object to be positioned is obtained and the position of the object to be positioned within the vehicle is sent to the object in accordance with its ID.

8. A control system within a vehicle based on mixed audio, wherein the system includes:

a positioning apparatus within a vehicle as defined in claim 1.

9. The control system within a vehicle based on mixed audio as set forth in claim 8, wherein an authorizing module entitles the object to be positioned only with a right to control those equipment near itself.

10. A control system within a vehicle based on mixed audio, wherein the system includes:

a positioning apparatus within a vehicle as defined in claim 3.

* * * * *